United States Patent
Shimizu et al.

(10) Patent No.: US 12,436,524 B2
(45) Date of Patent: Oct. 7, 2025

(54) SCADA WEB HMI CLIENT DEVICE AND SCADA WEB HMI SYSTEM

(71) Applicant: TMEIC CORPORATION, Tokyo (JP)

(72) Inventors: Ryo Shimizu, Tokyo (JP); Akira Nojima, Tokyo (JP); Nobuo Shimizu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 281 days.

(21) Appl. No.: 18/007,487

(22) PCT Filed: Jul. 7, 2021

(86) PCT No.: PCT/JP2021/025635
§ 371 (c)(1),
(2) Date: Jan. 31, 2023

(87) PCT Pub. No.: WO2023/281663
PCT Pub. Date: Jan. 12, 2023

(65) Prior Publication Data
US 2023/0280724 A1   Sep. 7, 2023

(51) Int. Cl.
G05B 19/418 (2006.01)

(52) U.S. Cl.
CPC ..... G05B 19/4183 (2013.01); G05B 19/4185 (2013.01)

(58) Field of Classification Search
USPC .......................................................... 700/9
See application file for complete search history.

(56) References Cited

U.S. PATENT DOCUMENTS

2003/0014322 A1*  1/2003  Kreidler ............. G06Q 10/0637
                                                              705/305
2003/0014387 A1*  1/2003  Kreidler ............. G06Q 10/0637
                                    (Continued)

FOREIGN PATENT DOCUMENTS

CN          112639642 A      4/2021
JP          63-44202 A       2/1988
                (Continued)

OTHER PUBLICATIONS

International Search Report and Written Opinion mailed on Sep. 14, 2021, received for PCT Application PCT/JP2021/025635, filed on Jul. 7, 2021, 11 pages including English Translation.

(Continued)

*Primary Examiner* — Hien D Khuu
(74) *Attorney, Agent, or Firm* — XSENSUS LLP

(57) ABSTRACT

The SCADA web HMI client device runs a plurality of web browsers communicating with a web server. A first web browser is displayed on first monitor and draws an HMI screen for monitoring and controlling an industrial plant. A second web browser is displayed on a second monitor and draws the HMI screen. An operation right table is obtained from the web server. If, in the operation right table, the first web browser is not permitted to operate the HMI screen, an operation part positioned on the HMI screen of the first web browser is drawn in an inoperable state. If, in the operation right table, the second web browser is permitted to operate the HMI screen, the operation part positioned on the HMI screen of the second web browser is drawn in an operable state.

8 Claims, 6 Drawing Sheets

(56) References Cited

U.S. PATENT DOCUMENTS

| | | | |
|---|---|---|---|
| 2008/0189536 A1* | 8/2008 | Mann | G05B 19/0426 713/1 |
| 2009/0254655 A1 | 10/2009 | Kidwell et al. | |
| 2012/0229379 A1 | 9/2012 | Louch | |
| 2021/0389748 A1* | 12/2021 | McAdam | G05B 19/4083 |

FOREIGN PATENT DOCUMENTS

| | | | |
|---|---|---|---|
| JP | 4-5725 A | | 1/1992 |
| JP | H05-241757 A | | 9/1993 |
| JP | 2013-207711 A | | 10/2013 |
| JP | 2017-27211 A | | 2/2017 |
| JP | 2017027211 A | * | 2/2017 |
| TW | M575142 U | | 3/2019 |
| TW | 202115552 A | * | 4/2021 |
| WO | WO_2020090033 A1 | * | 5/2020 |
| WO | 2021/015022 A1 | | 1/2021 |
| WO | WO_2021015022 A1 | * | 1/2021 |

OTHER PUBLICATIONS

Office Action issued on Oct. 2, 2023, in corresponding Taiwanese patent Application No. 111125583, 16 pages.

Office Action issued on Jan. 30, 2024, in corresponding Japanese patent Application No. 2023-532952, 6 pages.

English translation of the International Preliminary Report On Patentability (Chapter I) issued on Jan. 18, 2024, in corresponding PCT/JP2021/025635, 5 pages.

Office Action issued May 29, 2025 in Chinese Patent Application No. 202180057369.4 with machine English translation.

Office Action issued Jun. 26, 2025 in Indian Patent Application No. 202317003993.

* cited by examiner

SCADA WEB HMI CLIENT DEVICE AND SCADA WEB HMI SYSTEM

CROSS-REFERENCE TO RELATED APPLICATION

The present application is based on PCT filing PCT/JP2021/025635, filed Jul. 7, 2021, the entire contents of which are incorporated herein by reference.

FIELD

The present invention relates to a SCADA web HMI client device and a SCADA web HMI system.

BACKGROUND

Supervisory control and data acquisition (SCADA) is known as a system for monitoring and controlling social infrastructure systems. Social infrastructure systems include steel rolling systems, power transmission and transformation systems, water and sewage treatment systems, building management systems, and road systems.

SCADA is a type of industrial control system that performs computer-based system monitoring, process control, and data collection. SCADA requires immediacy (real-time performance) according to the processing performance of the system.

Typical SCADA consists of the following subsystems.
(1) Human Machine Interface (HMI)
An HMI is a mechanism that presents data on a monitored device to the operator and allows the operator to monitor and control the monitored device.
(2) Supervisory Control System
Supervisory Control System consists of a programmable logic controller (PLC), for example. The supervisory control system collects data on the monitored device and sends a control command to the monitored device.
(3) Remote Input/Output Device (Remote Input Output: RIO)
The remote input/output device connects to sensors installed in the monitored device, converts the sensor signals into digital data, and sends the digital data to the supervisory control system.
(4) Communication Infrastructure
The communication infrastructure connects the supervisory control system to the remote input/output device.

As an example of a SCADA HMI subsystem, Patent Literature 1 discloses a system with an HMI client device and an HMI server device.

In conventional SCADA, such as the one described in Patent Literature 1, the HMI server device sends data received from the PLC to the HMI client device. The HMI client device has a computer body, input devices such as a keyboard and mouse, and a monitor, and displays a single HMI screen on the monitor.

CITATION LIST

Patent Literature

[PTL 1] JP2017-27211A

SUMMARY

Technical Problem

By the way, in an implementation mode adopted in the operation room of a production line, for example, the same HMI screen is displayed in full screen on a large monitor for monitoring by many people and on a small desktop monitor for operator operation. In order to achieve this implementation mode using the HMI subsystem in Patent Literature 1, preparation of two HMI client devices: an HMI client device that connects to a large screen monitor and an HMI client device that connects to a small desktop monitor, is necessary.

However, considering cost reduction, installation space, failure rate, and communication load, it is desirable that the aforementioned implementation mode can be implemented with a single HMI client device.

After diligent research, the inventor has developed a browser-based SCADA HMI subsystem. According to this, the HMI screen can be implemented as a web application running on a web browser.

In addition, two monitors, a large monitor and a small desktop monitor, can be connected to one HMI client device, and two web browsers can be run and displayed on the respective monitors.

With this configuration, one HMI client device has one set of input devices (keyboard and mouse), and no two web browsers are operated simultaneously. On the other hand, since switching between the web browsers is possible, prevention of erroneous operation is necessary. To prevent erroneous operation, it is sometimes desirable that an HMI screen in the inoperable state be displayed on the large monitor used for monitoring by many people, while the HMI screen in the operable state be displayed on the small desktop monitor for the operator's operation.

An object of the present invention, which has been made to solve the aforementioned problems, is to provide a SCADA web HMI client device and a SCADA web HMI system that can be implemented on a single computer, setting the right to operate each HMI screen for each web browser, using the same HMI screen for presentation on the first web browser and for operation on the second web browser.

Solution to Problem

The first aspect relates to a SCADA web HMI client device and a SCADA web HMI system.

The SCADA web HMI system includes an HMI server device and an HMI client device.

The HMI server device transmits and receives signals related to a field machinery group that constitutes an industrial plant, to and from a programmable logic controller, and runs the web server.

The HMI client device runs a plurality of web browsers that transmit and receive the signals via the web server.

The HMI client device includes a processor, a first monitor, and a second monitor.

The processor is configured to:
run a first web browser that is displayed on the first monitor and draws an HMI screen for monitoring and controlling an industrial plant;
run a second web browser that is displayed on the second monitor and draws the HMI screen;
obtain from the web server an operation right table that defines the operability of the HMI screen for each web browser;
if, in the operation right table, the first web browser is not permitted to operate the HMI screen, draw in an inoperable state an operation part positioned on the HMI screen of the first web browser; and if, in the operation right table, the second web browser is permitted to operate the HMI screen, draw in an operable state the operation part positioned on the HMI screen of the second web browser.

The second aspect further has the following features, in addition to the first aspect.

The processor is further configured to:

when the operation part is in the operable state and a mouse pointer is over the operation part, change the shape or color of the mouse pointer from the inoperable state to the operable state; and when the operation part is in the inoperable state, keep the shape or color of the mouse pointer unchanged from the inoperable state even if the mouse pointer is over the operation part.

The third aspect further has the following features, in addition to the first or second aspect.

The processor is further configured to:

display on the HMI screen an operation right identification part that indicates the operability of the HMI screen;

if, in the operation right table, the first web browser is not permitted to operate the HMI screen, draw in an operation prohibition color the operation right identification part positioned on the HMI screen of the first web browser; and if, in the operation right table, the second web browser is permitted to operate the HMI screen, draw in an operation permission color the operation right identification part positioned on the HMI screen of the second web browser.

The fourth aspect further has the following features, in addition to any one of the first to third aspects.

The processor is further configured to:

if the first web browser is started again after exit, display the first web browser in a predetermined initial position and initial size on the first monitor independently of the position and size of the first web browser at the exit; and if the second web browser is started again after exit, display the second web browser in a predetermined initial position and initial size on the second monitor independently of the position and size of the second web browser at the exit.

Effects of Invention

According to the first aspect, with a single HMI client device, setting the right to operate the HMI screen for each web browser, the same HMI screen can be implemented for presentation on the first web browser and for operation on the second web browser.

According to the second aspect, the mouse pointer over the operation part is drawn in different ways of expression according to the presence or absence of the operation right. Consequently, the operator can easily identify whether the web browser the operator currently operating has the operation right.

According to the third aspect, the color of the operation right identification part showing the operability of the HMI screen is changed according to whether the web browser has the operation right. Consequently, the operator can easily identify whether the web browser has the operation right.

According to the fourth aspect, the web browser can be displayed in a predetermined initial position and initial size on the default monitor independently of its position and size of the web browser at the exit. Consequently, even if the web browser is operated out of operation for some reason, the web browser can be easily restored to its operational state.

DESCRIPTION OF EMBODIMENTS

Figure 1:
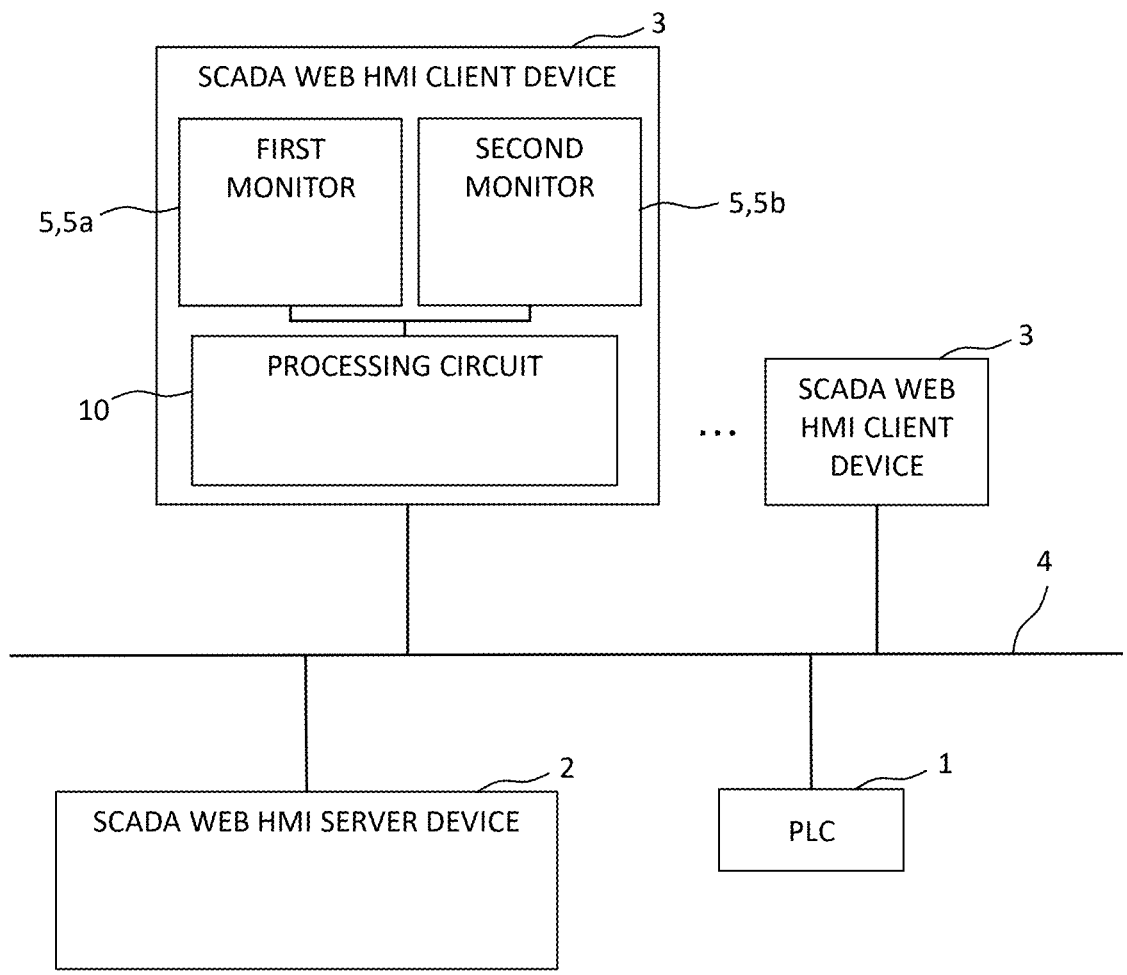
FIG. 1 is a diagram for explaining an example configuration of a SCADA web HMI system according to an embodiment of the present invention.

An embodiment of the present invention will be described in detail with reference to the drawings. Components common to the drawings are denoted by the same reference numeral, and duplicate explanations will be omitted.

EMBODIMENT

1. SCADA Web HMI System

FIG. 1 is a diagram for explaining an example configuration of a SCADA web HMI system according to the embodiment. The SCADA web HMI system shown in FIG. 1 includes a PLC 1, an HMI server device 2, and an HMI client device 3 mutually connected via a computer network 4. The computer network 4 is, for example, Ethernet (registered trademark).

The PLC 1 connects to a monitored device (a field machinery group (including actuators and sensors) that constitutes an industrial plant) via a control network which is not shown in the drawing. The PLC 1 periodically transmits packets containing block data to the computer network 4 by multicasting or broadcasting. A block data is a set of PLC signals. A block data may contain tens or hundreds of PLC signals. Types of PLC signals include input/output signals (including actuator control signals and sensor detection signals) and alarm signals. The PLC 1 also receives control signals related to the monitored device from the HMI server device 2.

Figure 2:
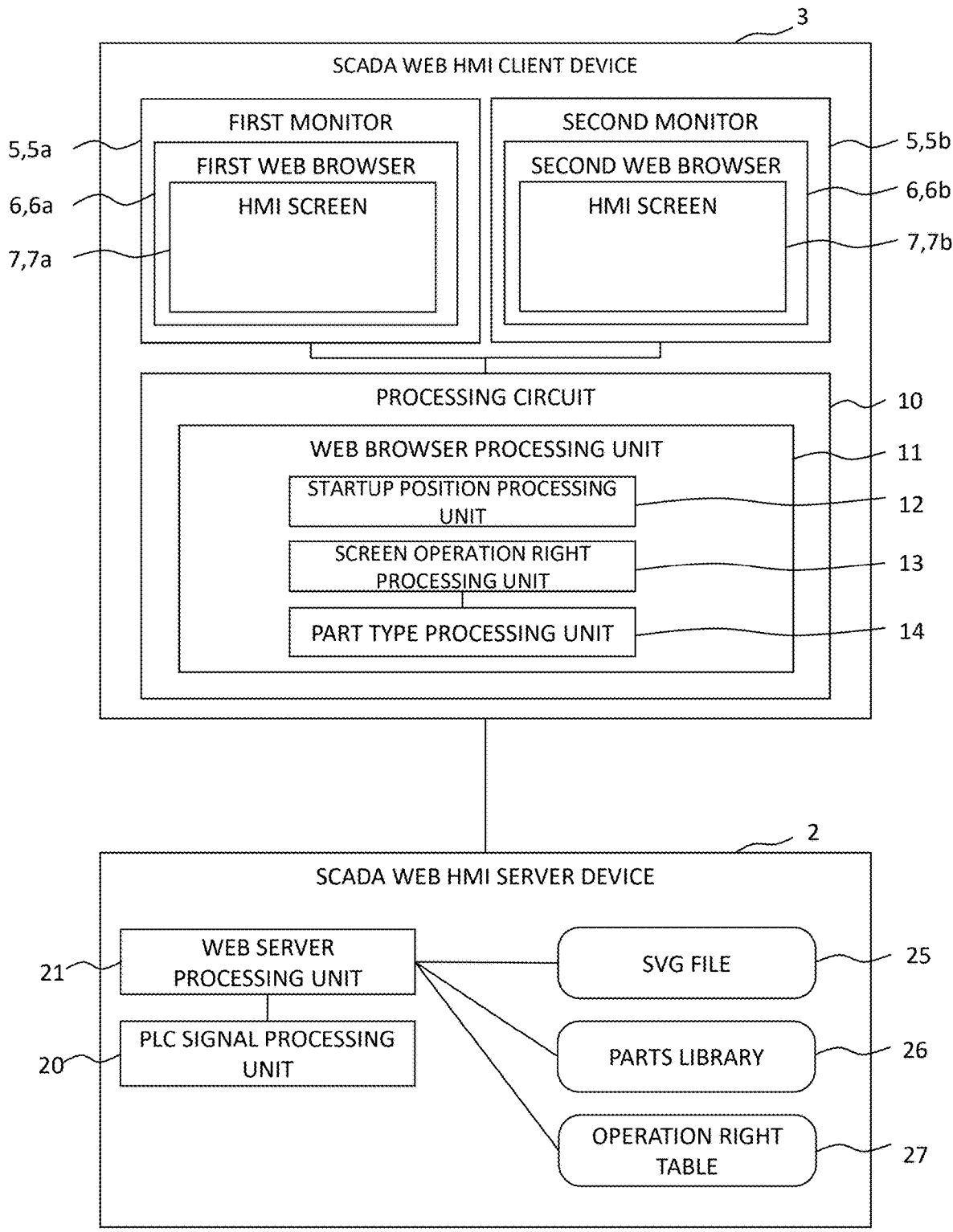
FIG. 2 is a block diagram illustrating an overview of the functions of an HMI server device and HMI client device according to the embodiment of the present invention.

The HMI server device 2 and the HMI client device 3 will be described with reference to FIG. 2. FIG. 2 is a block diagram illustrating an overview of the functions of an HMI server device 2 and HMI client device 3.

Figure 6:
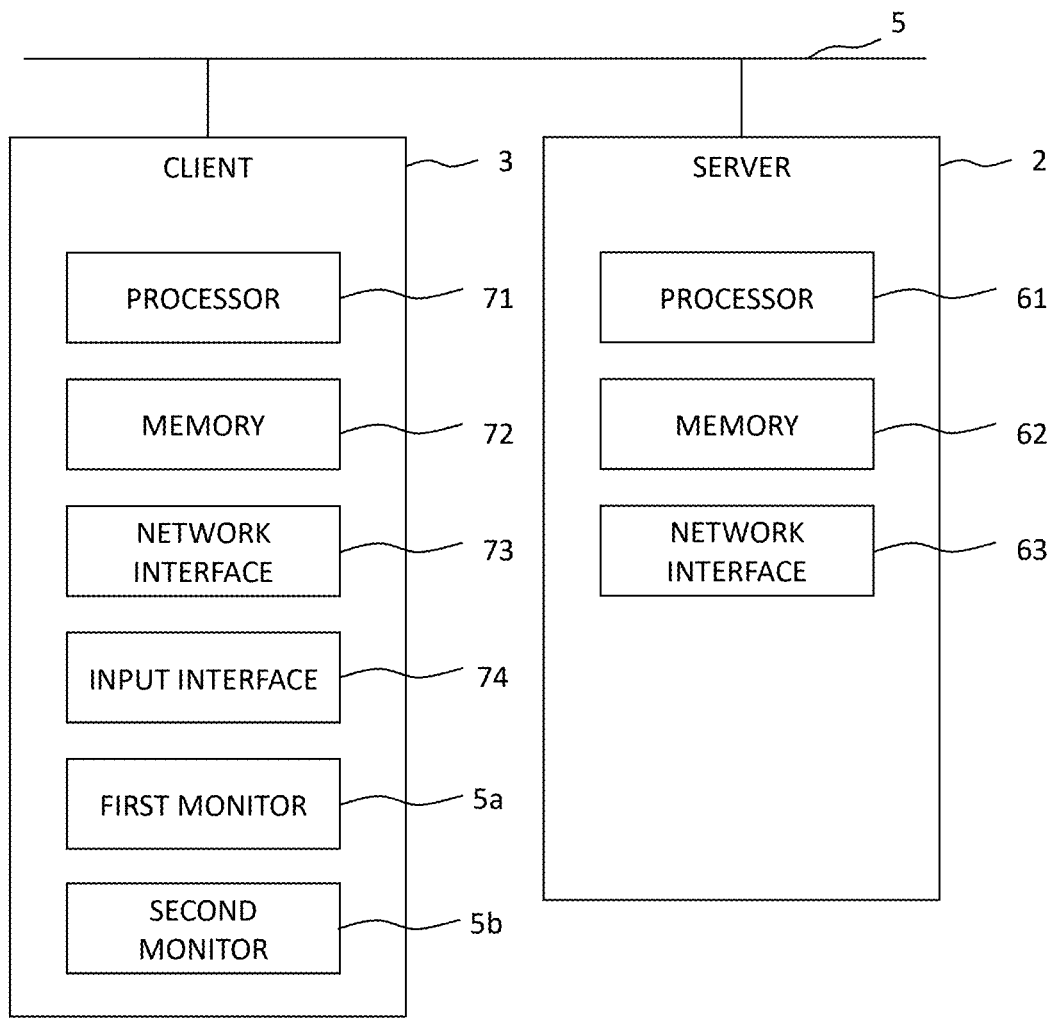
FIG. 6 is a block diagram showing an example of the hardware configurations of an HMI server device and an HMI client device.

The HMI server device 2 transmits and receives signals related to the field machinery group that constitutes the industrial plant to and from a programmable logic controller and runs a web server. As shown in FIG. 6 which will be described below, the HMI server device 2 includes a processor 61 that executes various types of processing and a memory 62 in which various types of information is stored. When the processor 61 executes a program stored in the memory 62, the processor 61 functions as a PLC signal processing unit 20 and a web server processing unit 21. The PLC signal processing unit 20 and the web server processing unit 21 can transmit and receive data to and from each other through inter-process communication.

The PLC signal processing unit 20 periodically transmits the PLC signals received from the PLC 1 to each web browser 6 (web browser processing unit 11) via the web server processing unit 21. The PLC signal processing unit 20 also transmits control signals received from each web browser 6 to the PLC 1 via the web server processing unit 21.

The web server processing unit 21 can communicate with each web browser 6 (web browser processing unit 11) of the HMI client device 3, using hypertext transfer protocol (HTTP), hypertext transfer protocol secure (HTTPS), and WebSocket. The web server processing unit 21 transmits contents in response to requests from each web browser 6 (web browser processing unit 11). The contents include HTML files (not shown in the drawing), scalable vector graphics (SVG) files 25 for each HMI screen, a parts library 26 describing operations for each part type, and an operation right table 27.

The parts library 26 contains a set of scripts that describe the operation for each part type. The scripts are JavaScript (registered trademark) programs defined for each part type. The scripts are given parameters (e.g., presence or absence of an operation right defined in the operation right table 27) as necessary and can be executed on each web browser 6.

Figure 3:
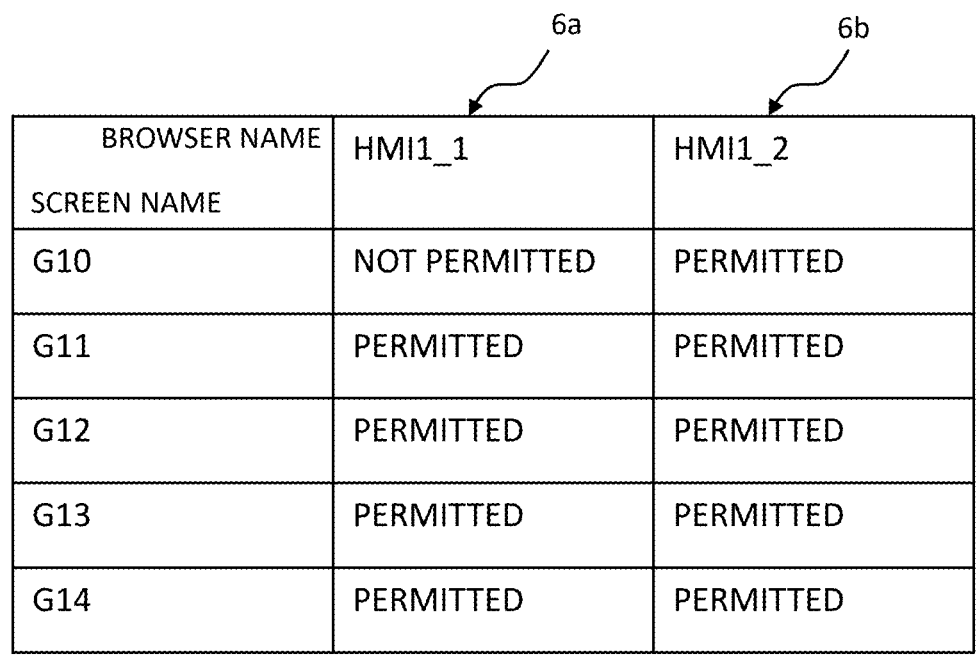
FIG. 3 is a diagram showing an example of an operation right table according to Embodiment 1 of the present invention.

The operation right table 27 is a table that defines whether each web browser 6 has the right to operate each HMI screen 7 (operation is allowed) or not (operation is not allowed). FIG. 3 is a diagram showing an example of the operation right table 27 according to this embodiment. "G10" to "G14" are the screen names of the HMI screens 7, "HMI1_1" is the name of the first web browser 6a, and "HMI1_2" is the browser name of the second web browser 6b. For example, the browser name is a combination of the computer device name and monitor number. In the example shown in FIG. 3, the first web browser 6a (HMI1_1) does not have the right to operate the HMI screen (G10). In contrast, the second web browser 6b (HMI1_2) has the right to operate the HMI screen (G10).

2. SCADA Web HMI Client Device Configuration

Description will be made referring back to FIG. 2. The HMI client device 3 includes a processing circuit 10 (a processor 71 that executes various types of processing, and a memory 72 in which various types of information is stored, shown in FIG. 6 which will be described later), and a plurality of monitors 5 (a first monitor 5a and a second monitor 5b). When the processor 71 executes the program stored in the memory 72, the processor 71 functions as the web browser processing unit 11.

The web browser processing unit 11 is run for each web browser 6. The web browser 6 draws HMI screens 7 for monitoring and controlling industrial plants. The HMI screen 7 is switched to another HMI screen 7 by operator's operation. A plurality of parts are positioned on the HMI screen 7. The parts include, for example, operation parts for sending control signals to the PLC 1 in response to operator's operations, display parts whose display states (numerical values, characters, colors, and shapes) change according to the received PLC signals, screen transition parts for switching to other HMI screens, and operation right identification parts, such as operation right lamps, that change in color according to the presence or absence of the operation right.

At startup, each web browser 6 (web browser processing unit 11) obtains the aforementioned HTML file, SVG file 25, parts library 26, and operation right table 27, from the web server processing unit 21. Based on these, the web browser 6 draws the HMI screen 7 on which the parts are positioned. Each web browser 6 is run in a mode that does not use cache in order to constantly obtain the latest files from the web server processing unit 21 at startup.

The web browser processing unit 11 includes a startup position processing unit 12, a screen operation right processing unit 13, and a part type processing unit 14.

The startup position processing unit 12 displays the web browser 6 in a predetermined initial position and initial size on the default monitor 5 independently of its position and size of the web browser 6 at the exit. For example, if the first web browser 6a is started again after exit, the first web browser 6a is displayed in full screen on the first monitor 5a. Similarly, when the second web browser 6b is started again after exit, the second web browser 6b is displayed in full screen on the second monitor 5b. Hence, even if the web browser is operated out of operation for some reason, the web browser 6 can be easily restored to its operational state.

The screen operation right processing unit 13 reads the operation right table 27 obtained from the HMI server device 2 and determines presence or absence of the right to operate each HMI screen 7 for each web browser 6.

The part type processing unit 14 executes the scripts for each part type contained in the aforementioned parts library 26 according to the part types of the parts positioned on the HMI screen 7. The following describes, among the part types, the operation parts and operation right identification parts whose operation changes according to the presence or absence of operation right (parameter values) passed to the scripts.

Regarding the operation parts, if the web browser 6 is not permitted to operate the HMI screen 7 in the operation right table 27, the operation parts positioned on the HMI screen 7 of the web browser 6 are drawn in the inoperable state. If the web browser 6 is permitted to operate the HMI screen 7 in the operation right table 27, the operation parts positioned on the HMI screen 7 of the web browser 6 are drawn in the operable state.

In the operable state, the operation parts accept the operator's execution operation (e.g., mouse click) and transmits a control signal to the HMI server device 2 in response to the operation. In the inoperable state, the operation parts do not accept the operator's execution operation.

In addition, the mouse-over process differs between the operable and inoperable states. In the operable state, when the mouse pointer is over one of the operation parts, the shape or color of the mouse pointer changes from the inoperable state to the operable state. In the inoperable state, even if the mouse pointer is over one of the operation parts, the shape or color of the mouse pointer remains unchanged from the inoperable state. Hence, the mouse pointer over the operation part is drawn with different expressions depending on the presence or absence of the operation right. Consequently, the operator can easily identify whether the web browser 6 that he/she is currently operating has the operation right.

Regarding the operation right identification part (operation right lamp), if the web browser 6 is not permitted to operate the HMI screen 7 in the operation right table 27, the operation right identification part positioned on the HMI screen 7 of the web browser 6 is drawn in an operation prohibition color. The operation prohibition color is, for example, red. If the web browser 6 is permitted to operate the HMI screen 7 in the operation right table 27, the operation right identification part positioned on the HMI screen 7 of the web browser 6 is drawn in an operation permission color. The operation permission color is, for example, green. Hence, the color of the operation right identification part showing the operability of the HMI screen 7 is changed according to whether the web browser 6 has the operation right. Consequently, the operator can easily identify whether the web browser 6 has the operation right.

3. Example Behavior of SCADA Web HMI Client Device

Figure 4:
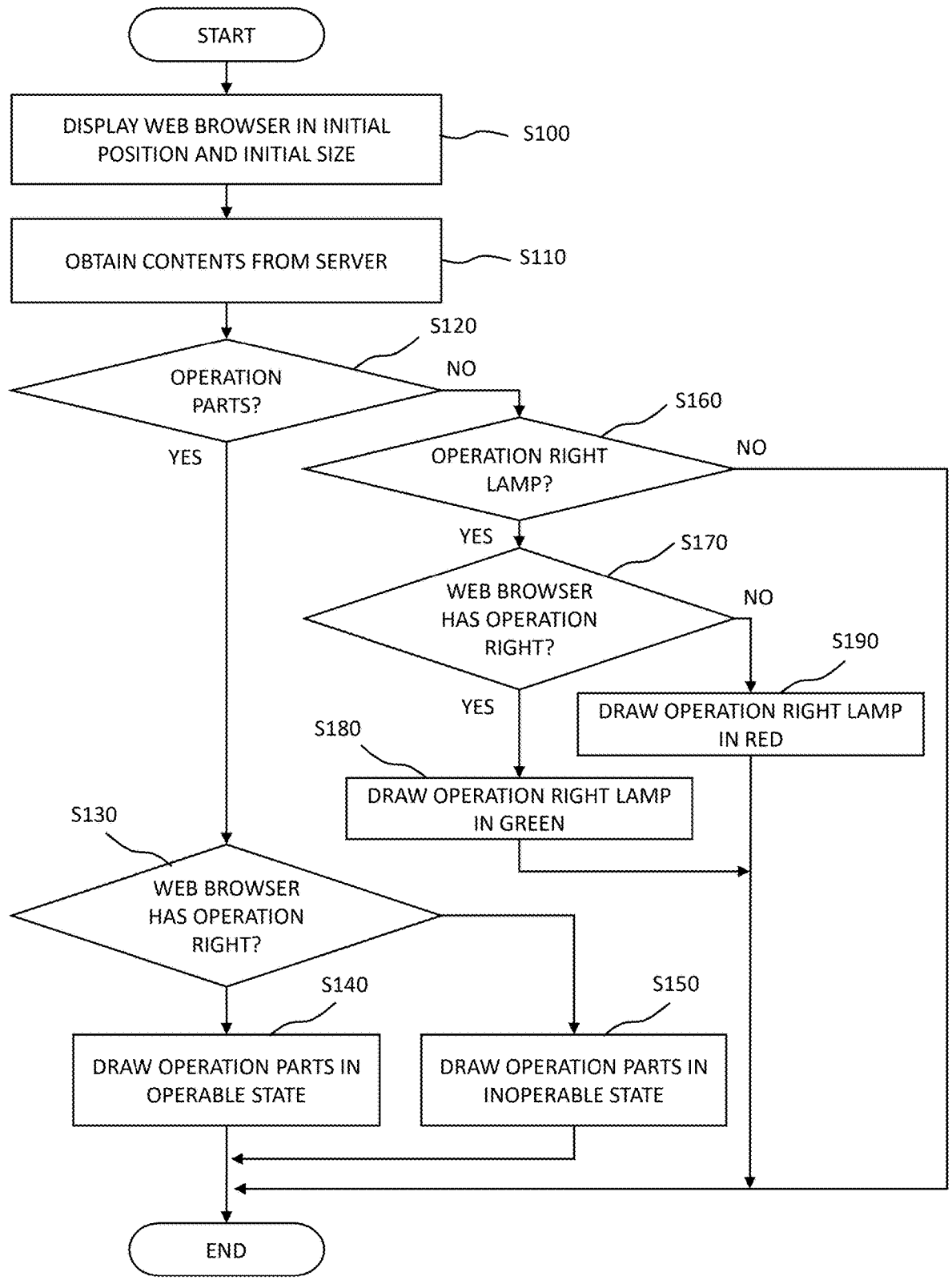
FIG. 4 is a flowchart for explaining an example of the processing in an HMI client device 3 according to Embodiment 1 of the present invention.
Figure 5:
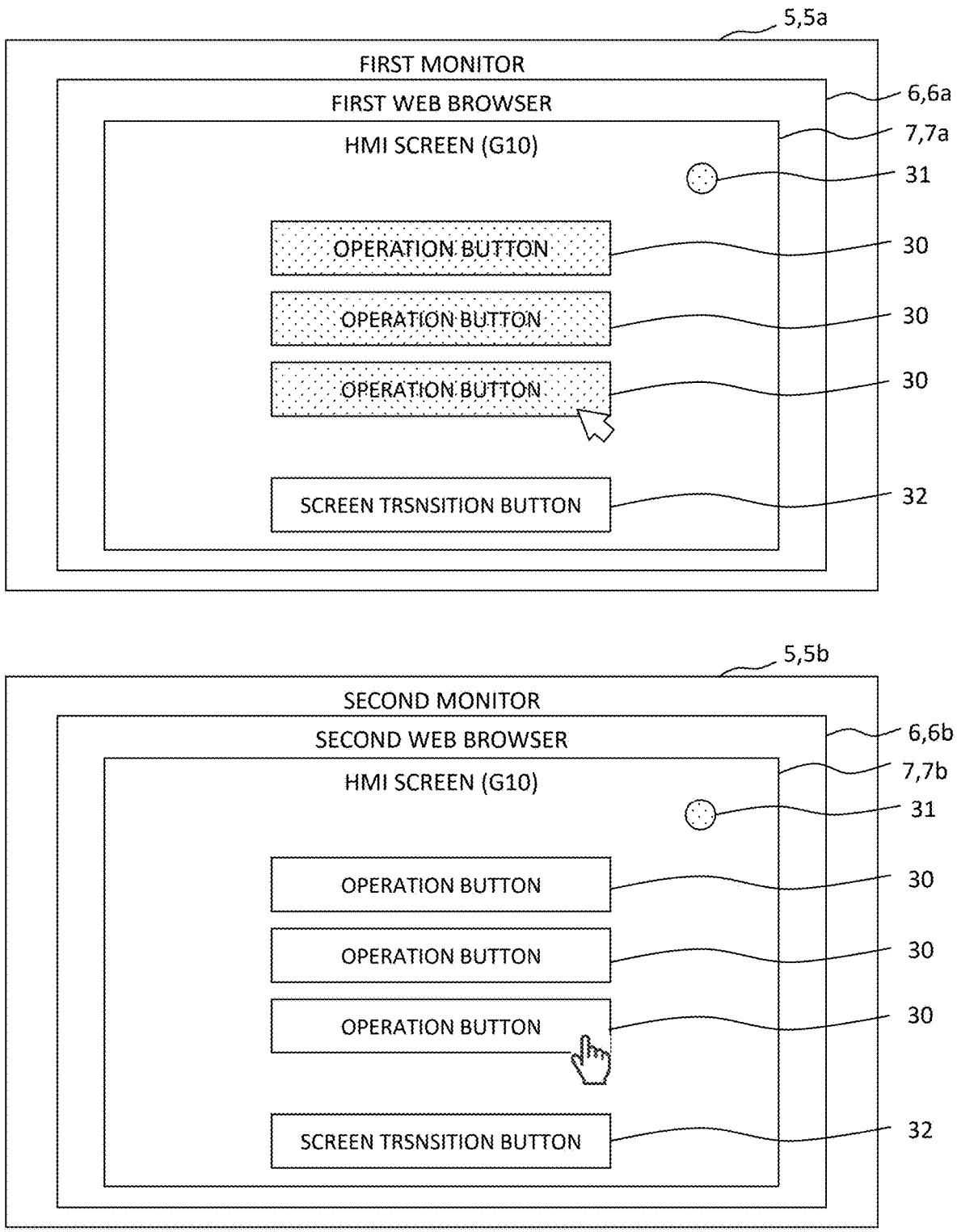
FIG. 5 is a diagram showing an example of an HMI screen in the inoperable state drawn on a first web browser and an example of an HMI screen in the operable state drawn on a second web browser.

Referring to FIGS. 3 to 5, the following explains how the HMI screen 7 is displayed in each web browser 6 depending on presence or absence of the operation right. FIG. 3 is a diagram showing an example of the aforementioned operation right table 27. FIG. 4 is a flowchart for explaining an example of the processing in the HMI client device 3. FIG. 5 is a diagram showing an example of the HMI screen 7 in the inoperable state drawn on the first web browser 6a and an example of the HMI screen 7 in the operable state drawn on the second web browser 6b.

In Step S100 shown in FIG. 4, the HMI client device 3 runs the web browser 6. The web browser processing unit 11 displays the web browser 6 in a predetermined initial position and initial size on the default monitor 5 independently of its position and size of the web browser 6 at the exit.

In the example shown in FIG. 5, the first web browser 6a is displayed in full screen on the first monitor 5a, and the second web browser 6b is displayed in full screen on the second monitor 5b.

In Step S110, each web browser 6 obtains contents from the HMI server device 2. The contents include the aforementioned HTML files, SVG files 25, parts library 26, and operation right table 27. Note that obtainment of the parts library 26 and the operation right table 27 are only necessary at startup of the web browser 6.

The example shown in FIG. 5 shows that the same HMI screen (G10) is displayed on the first web browser 6a and the second web browser 6b, and each web browser 6 obtains the same contents.

In Steps S120 to S150, each web browser 6 processes the operation parts positioned on the HMI screen 7 (the operation buttons 30 shown in FIG. 5). The web browser processing unit 11 determines whether the web browser 6 drawing an HMI screen 7 on which the operation parts are positioned has the right to operate the HMI screen 7 (Steps S120 and S130). If it has the operation right, the part type processing unit 14 draws the operation parts in the operable state (Step S140). In contrast, if it does not have the operation right, the part type processing unit 14 draws the operation parts in the inoperable state (Step S150).

In the example shown in FIG. 5, the operation right table 27 in FIG. 3 shows that the operation of the HMI screen (G10) in the first web browser (HMI1_1) is not permitted (operation right is absent). Consequently, the operation buttons 30 are drawn in the inoperable state. In the inoperable state, the shape of the mouse pointer remains unchanged from an arrow even if the mouse pointer is over one of the operation buttons 30. In addition, the operation buttons 30 are drawn in a color that shows that the operation is disabled.

In contrast, the operation right table 27 in FIG. 3 shows that the operation of the HMI screen (G10) in the second web browser (HMI1_2) is permitted (operation right is present). Consequently, the operation buttons 30 are drawn in the operable state. When the mouse pointer is over one of the operation buttons 30 in the operable state, the shape of the mouse pointer changes from an arrow to a finger shape. In addition, the operation buttons 30 are drawn in a color that shows that the operation is permitted.

In Steps S160 to S190, each web browser 6 processes the operation right identification part positioned on the HMI screen 7 (the operation right lamp 31 shown in FIG. 5). The web browser processing unit 11 determines whether the web browser 6 drawing an HMI screen 7 on which the operation right lamp 31 is positioned has the right to operate the HMI screen 7 (Steps S160 and S170). If it has the operation right, the part type processing unit 14 draws the operation right lamp 31 in the operation permission color (green) (Step S180). In contrast, if it does not have the operation right, the part type processing unit 14 draws the operation right lamp 31 in the operation prohibition color (red) (Step S190).

In the example shown in FIG. 5, the first web browser 6a does not have the right to operate the HMI screen (G10) and the operation right lamp 31 is thus drawn in red. The second web browser 6b has the right to operate the HMI screen (G10) and the operation right lamp 31 is thus drawn in green.

If the condition of Step S160 is not satisfied, i.e., the part is neither an operation part nor an operation right identification part, it is drawn independently of the operation right.

In the example shown in FIG. 5, the screen transition button 32 is drawn as an operable button regardless of the operation right. In addition, the presentation parts that only present PLC signal values (not shown in the drawing) are drawn as inoperable parts regardless of the operation right.

By the way, regarding the aforementioned specific examples, the drawing of the HMI screen 7 at startup of the web browser 6 has been explained. However, pressing the screen transition button 32 may trigger transition to another HMI screen 7. In this case, the web browser processing unit 11 obtains from the HMI server device 2 an HTML file and an SVG file 25 related to the other HMI screen 7, and executes the processing of Step S120 or later.

4. Effects

As explained above, with the SCADA web HMI system of this embodiment, with a single HMI client device 3, setting the right to operate the HMI screen 7 for each web browser 6, the same HMI screen 7 can be implemented for presentation on the first web browser and for operation on the second web browser. Besides, three or more web browsers 6 can be run on a single HMI client device 3, which reduces cost, space, failure rate, and communication load. In addition, the operation parts and operation right identification part are drawn so that the operator can identify them easily, depending on the presence or absence of the operation right, which reduces erroneous operations.

5. Hardware Configuration Example

FIG. 6 is a block diagram showing an example of the hardware configurations of the HMI server device 2 and the HMI client device 3.

Each type of processing in the HMI server device 2 described above is achieved using a processing circuit. A processing circuit consists of a processor 61, a memory 62, and a network interface 63 connected together. The processor 61 executes various programs stored in the memory 62 to implement each function of the HMI server device 2. The memory 62 includes a main memory and an auxiliary memory. In the memory 62, the HTML files, SVG files 25, and parts library 26, and operation right table 27 described above are prestored. The network interface 63 connects to other devices in the same network through the computer network 4 so that they can communicate with each other.

Each type of processing in the HMI client device 3 described above is achieved using a processing circuit. A processing circuit consists of a processor 71, a memory 72, a network interface 73, an input interface 74, a first monitor 5a, and a second monitor 5b connected together. The processor 71 executes various programs stored in the memory 72 to implement each function of the HMI client device 3. The memory 72 includes a main memory and an auxiliary memory. The network interface 73 connects to other devices in the same network through the computer network 4 so that they can communicate with each other. The input interface 74 is a set of input devices including a keyboard, mouse, touch panel, and the like.

Although the embodiments of the present invention has been described so far, the present invention should not be limited to the aforementioned embodiments, but can be implemented with various modifications without departing from the scope of the present invention. When the number, quantity, amount, range, and other numeric values related to each type of component are referred to in the aforementioned embodiments, the present invention should not be limited by the numeric values unless specifically stated or clearly specified using such numeric values in principle. Also, the structures and the like described in the aforementioned embodiments are not necessarily essential to the present invention, unless otherwise specifically stated or clearly specified in principle.

REFERENCE SIGNS LIST

1 Programmable logic controller (PLC)
2 HMI server device
3 HMI client device
4 Computer network
5 Monitor
5a First monitor
5b Second monitor
6 Web browser
6a First web browser
6b Second web browser
7 HMI Screen
10 Processing circuit
11 Web browser processing unit
12 Startup position processing unit
13 Screen operation right processing unit
14 Part type processing unit
20 PLC signal processing unit
21 Web server processing unit
25 SVG file
26 Parts Library
27 Operation right table
30 Operation button
31 Operate right lamp
32 Screen transition button
61, 71 Processor
62, 72 Memory
63, 73 Network interface
74 Input interface

The invention claimed is:

1. A SCADA web HMI client device comprising:
a first monitor;
a second monitor; and
processing circuitry configured to
run a first web browser that is displayed on the first monitor and draws an HMI screen for monitoring and controlling an industrial plant;
run a second web browser that is displayed on the second monitor and draws the HMI screen;
obtain from a web server an operation right table that defines the operability of the HMI screen for each web browser, wherein the first web browser being not permitted to operate the HMI screen of the first monitor while the second web browser being permitted to operate the HMI screen of the second monitor by the operation right table;
based on the operation right table, run the first web browser to draw in an inoperable state an operation part positioned on the HMI screen of the first monitor; and
based on the operation right table, run the second web browser to draw in an operable state the operation part positioned on the HMI screen of the second monitor.

2. The SCADA web HMI client device according to claim 1,
wherein the processing circuitry is further configured to:
when a mouse pointer is over the operation part positioned on the HMI screen of the second monitor, change the shape or color of the mouse pointer from the inoperable state to the operable state; and
keep the shape or color of the mouse pointer unchanged from the inoperable state even if the mouse pointer is over the operation part positioned on the HMI screen of the first monitor.

3. The SCADA web HMI client device according to claim 1,
wherein the processing circuitry is further configured to:
display on the HMI screen an operation right identification part that indicates the operability of the HMI screen;
run the first web browser to draw in an operation prohibition color the operation right identification part positioned on the HMI screen of the first monitor; and
run the second web browser to draw in an operation permission color the operation right identification part positioned on the HMI screen of the second monitor.

4. The SCADA web HMI client device according to claim 1,
wherein the processing circuitry is further configured to:
under a condition that the first web browser is started again after exit, display the first web browser in a predetermined initial position and initial size on the first monitor independently of the position and size of the first web browser at the exit; and
under a condition that the second web browser is started again after exit, display the second web browser in a predetermined initial position and initial size on the second monitor independently of the position and size of the second web browser at the exit.

5. A SCADA web HMI system comprising:
an HMI server device configured to transmit and receive signals related to a field machinery group constituting an industrial plant to and from a programmable logic controller and configured to run a web server; and
an HMI client device comprising processing circuitry, a first monitor, and a second monitor,
wherein the processing circuitry is configured to:
run a first web browser that is displayed on the first monitor and draws an HMI screen for monitoring and controlling the industrial plant;
run a second web browser that is displayed on the second monitor and draws the HMI screen;

obtain from the web server an operation right table that defines the operability of the HMI screen for each web browser, wherein the first web browser being not permitted to operate the HMI screen of the first monitor while the second web browser being permitted to operate the HMI screen of the second monitor by the operation right table;

based on the operation right table, run the first web browser to draw in an inoperable state an operation part positioned on the HMI screen of the first monitor; and based on the operation right table run the second web browser to draw in an operable state the operation part positioned on the HMI screen of the second monitor.

6. The SCADA web HMI system according to claim 5, wherein the processing circuitry is further configured to:

when a mouse pointer is over the operation part positioned on the MHI screen of the second monitor, change the shape or color of the mouse pointer from the inoperable state to the operable state; and keep the shape or color of the mouse pointer unchanged from the inoperable state even if the mouse pointer is over the operation part positioned on the HMI screen of the first monitor.

7. The SCADA web HMI system according to claim 5, wherein the processing circuitry is further configured to:

display on the HMI screen an operation right identification part that indicates the operability of the HMI screen;

run the first web browser to draw in an operation prohibition color the operation right identification part positioned on the HMI screen of the first monitor; and run the second web browser to draw in an operation permission color the operation right identification part positioned on the HMI screen of the second monitor.

8. The SCADA web HMI system according to claim 5, wherein the processing circuitry is further configured to:

under a condition that the first web browser is started again after exit, display the first web browser in a predetermined initial position and initial size on the first monitor independently of the position and size of the first web browser at the exit; and under a condition that the second web browser is started again after exit, display the second web browser in a predetermined initial position and initial size on the second monitor independently of the position and size of the second web browser at the exit.

* * * * *

UNITED STATES PATENT AND TRADEMARK OFFICE
CERTIFICATE OF CORRECTION

PATENT NO. : 12,436,524 B2  
APPLICATION NO. : 18/007487  
DATED : October 7, 2025  
INVENTOR(S) : Ryo Shimizu et al.

Page 1 of 1

It is certified that error appears in the above-identified patent and that said Letters Patent is hereby corrected as shown below:

In the Claims

Column 11, Line 17, Claim 6, "the MHI screen" should read -- the HMI screen --.

Signed and Sealed this  
Ninth Day of December, 2025

John A. Squires  
*Director of the United States Patent and Trademark Office*